No. 760,348. PATENTED MAY 17, 1904.
A. J. ROBERTSON.
WHEEL.
APPLICATION FILED MAR. 4, 1903.
NO MODEL.
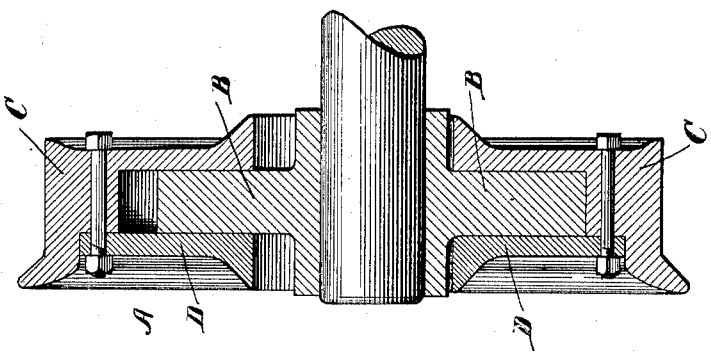
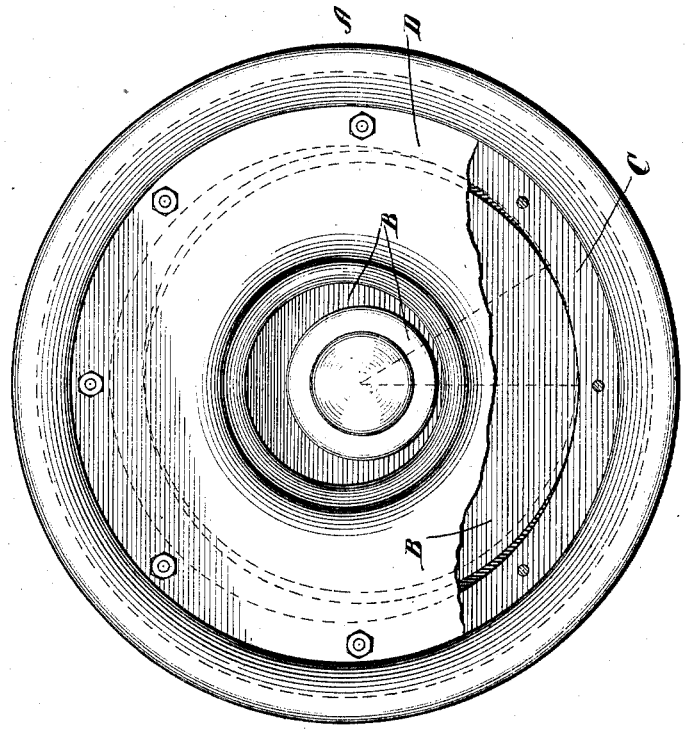
Witnesses:
Ira D. Perry
G. B. Weir
Inventor:
Archibald J. Robertson No. 760,348. Patented May 17, 1904.

UNITED STATES PATENT OFFICE.

ARCHIBALD J. ROBERTSON, OF CHICAGO, ILLINOIS.

WHEEL.

SPECIFICATION forming part of Letters Patent No. 760,348, dated May 17, 1904.

Application filed March 4, 1903. Serial No. 146,193. (No model.)

*To all whom it may concern:*

Be it known that I, ARCHIBALD J. ROBERTSON, a subject of the King of Great Britain, and a resident of the city of Chicago, in the county of Cook and State of Illinois, have invented certain new and useful Improvements in Wheels, of which the following is a specification.

My invention relates to the propulsion of wheeled vehicles; and its object is to increase the effectiveness of the propelling force applied at the axle of the wheel.

To this end my invention consists in means for keeping the weight of a vehicle while subjected to a pulling or pushing force slightly forward of wheel-base with respect to the direction of motion.

The invention further consists in a vehicle-wheel comprising an inner and an outer rotating element having separate axes of rotation and differential speeds, but coöperative in supporting the weight of the load, one of said elements supporting the axle and the weight upon the other element and the latter providing the wheel-base with respect to the track.

The invention further consists in a wheel having a rotatively free rim of larger diameter than the body of the wheel whereby movement of the supporting-axis for the load will be in advance of the wheel-base, and hence the center of gravity maintained at a point unsupported upon the track.

My invention further consists in a wheel divided on a line between its center and circumference and means for preventing lateral movement of the divided portions with relation to each other; and my invention further consists in the novel details of construction and combinations of parts, all as hereinafter fully described, and particularly pointed out in the claims.

The invention will be more readily understood by reference to the accompanying drawings, forming a part of this specification, and in which—

Figure 1 is a view representing a side elevation of a wheel embodying my invention. Fig. 2 is a section through the wheel, taken on a line at right angles to the plane of Fig. 1.

In the drawings, A represents the outer part of the wheel partly incasing the inner part B, to which the axle is secured.

C is the rim or tread of the outer wheel, and the latter has the usual form of a flanged car-wheel.

D is a disk which constitutes the outer face of the tread-wheel A and is bolted, as shown, or secured to the latter in any suitable manner.

The innner part of the wheel is mounted on the axle in the usual manner, and its outer circle is inclosed in a receptacle formed to receive it in the outer or tread part. The sides of the outer part A do not extend to the circumference of the journal, which leaves a free opening through which the latter projects and rotates therein without touching the walls of said opening. The outer circumference of the inner wheel being less than the inner circumference of the outer wheel, a certain amount of play is provided for the inner wheel with respect to the outer wheel, and the former is therefore permitted to travel upon the inner rim of the latter. As the journal does not touch the walls of the opening in the part A, the only resting place for the wheel B is the inner periphery of the outer part A, and when power is applied to draw the vehicle the inner part B is moved in advance of the vertical center of the outer part, whereby the load is thrown forward of the wheel-base, thus utilizing the weight of the vehicle to assist its own propulsion. While power is applied the load or weight of the vehicle is always carried at an off-center point from the ground or rail contact. The inner part B is made to fit the lateral dimensions of the receptacle formed in the outer part A, so as to avoid causing excessive friction.

In the figures of the drawings the vertical dotted line of Fig. 1 represents the center of the wheel-base line when the vehicle is at rest, and the inclined dotted line represents the direction in which the weight of the vehicle is moved with respect to the wheel-base when power is applied to the axle to move the latter to the right or toward Fig. 2.

As it is obvious that numerous modifications may be made in the embodiment of my invention by one skilled in the art without departing from the spirit of my invention, I do not desire to confine same to the specific construction herein shown and described.

Having thus described my invention, I claim as new and desire to secure by Letters Patent—

1. The combination, with a single inner wheel and axle, of an independently-rotatable tread supporting said wheel against the periphery thereof, and means independent of said axle for supporting said tread laterally upon said wheel.

2. The combination, with a single inner wheel supporting the axle, of a rim for said wheel of larger diameter than the latter and forming a tread supporting said wheel through the periphery thereof, and means independent of said axle for supporting said rim upon the faces of said wheel.

3. The combination, with a wheel and axle, of a rim revolubly mounted upon the periphery of said wheel and providing an independently-rotatable tread supporting said wheel against the periphery thereof, and a ring-form casing upon said rim providing a receptacle for the outer portion of said wheel.

4. The combination, with a single wheel and an axle rigidly secured thereto, of an outer rim for said wheel of larger diameter than the latter and forming a tread supporting said wheel through the periphery thereof, and means independent of said axle for supporting said rim or tread laterally upon the periphery of said wheel.

5. The combination, with a wheel having an axle rigidly secured thereto, of an outer casing having a wheel-tread thereupon and supporting said wheel through the periphery thereof, said casing being of larger circumference than said wheel and non-intersecting the circle described by the axle of said wheel.

6. The combination, with a wheel having an axle rigidly secured thereto, of an outer casing having a wheel-tread and a central aperture for said axle and supporting said wheel through the periphery thereof, said casing being of larger diameter than said wheel and freely revoluble with respect thereto and independently of the axle.

7. The combination, with an outer rotating element having an inner annular groove, of an inner element rotatable in said groove and independently of said outer element, the outer supporting the inner element through the periphery thereof.

8. The combination, with a wheel and axle, of an independently-rotatable rim or tread therefor having inner annular flanges providing a groove embracing the complete periphery of said wheel, said tread supporting said wheel through the periphery thereof.

9. The combination, with a wheel and axle, of an independently-rotatable rim or tread therefor of larger diameter than said wheel and having inner annular flanges providing a groove embracing the complete periphery of said wheel, said rim or tread supporting said wheel through the periphery thereof.

10. The combination of an independently-rotatable outer rim or tread having inner annular flanges providing an annular groove of uniform width, and a disk-faced wheel within said groove and bearing upon said tread.

11. The combination of a centrally-apertured disk having an annular lateral flange providing an exterior tread and an interior wheel-base, a disk similarly apertured and secured to the first-mentioned disk and flange to form therewith an internal annular groove or channel, and a wheel independently rotatable within said channel and supported upon said flange.

ARCHIBALD J. ROBERTSON.

Witnesses:
W. B. WAGGONER,
MARY F. LINCOLN.